(12) United States Patent
Thomson (10) Patent No.: US 7,308,232 B2
(45) Date of Patent: Dec. 11, 2007

(54) METHOD AND APPARATUS FOR ESTIMATING A CHANNEL BASED ON CHANNEL STATISTICS

(75) Inventor: David J. Thomson, Kingston (CA)

(73) Assignee: Lucent Technologies Inc., Murray Hill, NJ (US)

( * ) Notice: Subject to any disclaimer, the term of this patent is extended or adjusted under 35 U.S.C. 154(b) by 1065 days.

(21) Appl. No.: 10/177,732

(22) Filed: Jun. 21, 2002

(65) Prior Publication Data
US 2003/0236072 A1    Dec. 25, 2003

(51) Int. Cl.
*H04B 17/00* (2006.01)

(52) U.S. Cl. ............... 455/67.11; 455/63.1; 375/231

(58) Field of Classification Search ........... 455/67.11, 455/67.13, 67.15, 63.1, 65; 370/334, 342, 370/441, 479; 375/206, 231, 340
See application file for complete search history.

(56) References Cited

U.S. PATENT DOCUMENTS 6,263,029 B1 * 7/2001 Alard et al. ............. 375/340
6,674,740 B1 * 1/2004 Siala ...................... 370/342

OTHER PUBLICATIONS

Garbow et al., "Matrix Eigensystem Routines—EISPACK Guide Extension," Lecture Notes in Computer Science, Section 2.1.5, 22, (1977).

* cited by examiner

*Primary Examiner*—Lee Nguyen (57) ABSTRACT

A method and apparatus are disclosed for equalizing a channel using improved channel estimates. The present invention assumes that fading will follow a statistical model and obtains an improved channel estimate using one or more basis functions to describe the channel based on known channel statistics. A Karhunen-Loeve expansion can be used for channel estimation to describe the channel. Waveforms are selected that are matched to characteristics of the channel, such as transmission waveforms whose energy is largely restricted to a bandwidth assigned to the channel. Coefficients are estimated for the basis functions using real-time data.

20 Claims, 4 Drawing Sheets

METHOD AND APPARATUS FOR ESTIMATING A CHANNEL BASED ON CHANNEL STATISTICS

FIELD OF THE INVENTION

The present invention relates to methods and apparatus for compensating for channel distortion and, more particularly, to a method and apparatus for equalizing a channel using improved channel estimates.

BACKGROUND OF THE INVENTION

A number of techniques have been developed to improve the speed and accuracy of digital communications. For example, a number of techniques have been proposed or suggested to compensate for the distortion that is inevitably present in a communication channel, such as equalization techniques that compensate for delay distortion and intersymbol interference.

J. G. Proakis, Digital Communications, McGraw-Hill, New York, 1989; and S. U. H. Qureshi, "Adaptive Equalization," Proceedings of the IEEE, Vol. 73, pp. 1349-1387, September, 1985, describe a number of known techniques that equalize relatively constant communication channels and adapt to changes that occur in the transmission characteristics of transmission channels due to changes in environmental and other conditions. Decision feedback equalizers having adaptation logic, for example, track slow variations in a channel after an initial learning phase. In this mode, it is assumed that the output of a decoder is correct with high probability. Error signals based on these output signals are then used to update the coefficients of the equalizer. By the time an equalizer has been trained for a given channel, however, the channel has likely already changed and the obtained tap coefficients may no longer be sufficiently accurate for current conditions.

Many wireless and optical communication channels, including cellular telephone channels, exhibit rapid changes in transmission characteristics, thereby causing even greater difficulty in adaptively equalizing such channels. When equalizing a mobile (cellular) radio channel, for example, fast adaptation is typically required, especially at high vehicle speeds. Such channels are typically characterized by Rayleigh fading, Doppler effects and delay spread. Prior art equalization techniques do not sufficiently mitigate the effects of such rapidly changing channel conditions. While the adaptive Viterbi Algorithm uses the globally best estimates of the transmitted data to update the estimates of the channel impulse response, processing used to develop these estimates necessarily introduces considerable complexity and delay. Furthermore, in a rapidly changing channel environment, the obtained channel estimates may no longer be sufficiently accurate for currently processed symbols.

Differential modulation encoding techniques have also been employed to minimize the effects of fading. Differential modulation encoding, however, demonstrates an irreducible error rate in fading channels even with high signal-signal-to-noise ratios. In addition, a number of equalization techniques employ a pilot carrier signal to estimate the channel and minimize the effects of fading. A pilot signal of a given frequency, however, cannot accurately estimate the fading characteristics of a channel for other frequencies, since fading characteristics are generally frequency dependent.

A need therefore exists for a method and apparatus for equalizing a channel that provides an improved channel estimate without the complexity and delay of prior techniques. A further need exists for a method and apparatus for equalizing a channel that provides a channel estimate using the same time and frequency characteristics as the transmitted data.

SUMMARY OF THE INVENTION

Generally, a method and apparatus are disclosed for equalizing a channel using improved channel estimates. The present invention assumes that fading will follow a statistical model and obtains an improved channel estimate using one or more basis functions to describe the channel based on known channel statistics. In an exemplary embodiment, a Karhunen-Loeve expansion is used for channel estimation with only the first two terms of the expansion used to describe the channel.

In addition, waveforms are selected that are matched to characteristics of the channel, such as transmission waveforms whose energy is largely restricted to a bandwidth assigned to the channel. In an exemplary embodiment, relatively narrow-band Slepian sequences or similar sequences are employed so that delay spread across the band is not a major problem and there is minimum energy leakage out of the assigned frequency band. Thereafter, coefficients are estimated for the basis functions using real-time data.

A more complete understanding of the present invention, as well as further features and advantages of the present invention, will be obtained by reference to the following detailed description and drawings.

DETAILED DESCRIPTION

Figure 1:
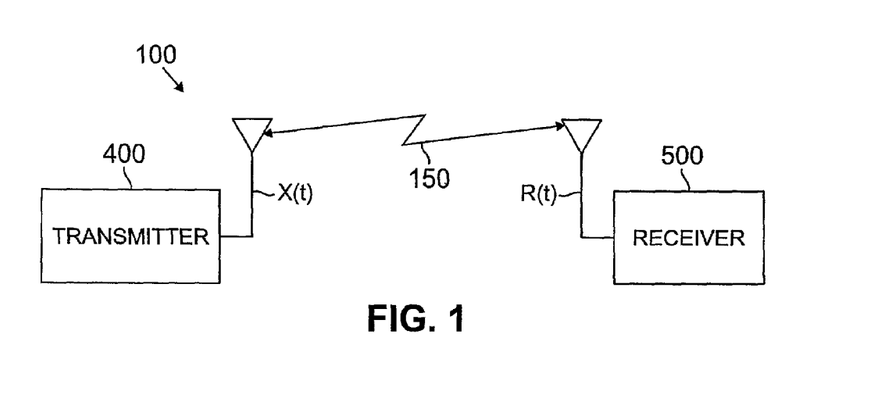
FIG. 1 illustrates a network environment in which the present invention can operate.

FIG. 1 illustrates a network environment 100 in which the present invention can be employed. As shown in FIG. 1, the network environment 100 includes a transmitter 400, discussed below in conjunction with FIG. 4, and a receiver 500, discussed below in conjunction with FIG. 5, that communicate over a channel 150. Generally, the present invention provides a modulation system for networks that exhibit fast fading, such as a high-capacity cellular system, other wireless networks, as well as optical channels, underwater audio channels or long range atmospheric channels. The fading is assumed to follow a statistical model. As discussed further below, a Karhunen-Loeve expansion is used for channel estimation with only the first two terms of the expansion normally used. The data coefficients are estimated using a channel inversion. As part of this process, an estimate of the signal-to-noise ratios of individual data coefficients is simultaneously obtained, allowing more efficient use of codes.

The exemplary embodiment described herein employs a block transmission data format where each user is assigned a time slot, in a similar manner to TDMA systems, to allow easier allocation of resources than a continuous channel and to allow flexibility with either data or voice usage. The basic building block is a Slepian sequence (or discrete prolate spheroidal sequence) so that there is minimum energy leakage out of the assigned frequency band. The property also allows efficient handling of many channels in parallel using fast Fourier transform techniques. The basic building blocks are relatively narrow-band so that delay spread across the band is not a major problem. It is not proposed to use equalizers.

Initially, a discussion is provided of the mathematical basis for the channel estimation techniques of the present invention, including a discussion of the equations and properties associated with the present invention. Thereafter, a discussion is provided of the transmitter 400 and receiver 500 that employ a number of the equations in conjunction with FIGS. 4 and 5, respectively.

Karhunen-Loeve Channel Expansion

Consider the network environment 100 shown in FIG. 1 for a Rayleigh fading channel where X(t) denotes the transmitted signal, and C(t) is a complex, narrow-band Gaussian process defining the instantaneous characteristics of the channel 150. The received signal is specified as follows:

$$R(t)=C(t)\cdot X(t)+N(t) \qquad (1)$$

where N(t) is stationary, complex, white Gaussian noise with variance defined as follows:

$$E\{|N(t)|^2\}=2BS_N, \qquad (2)$$

where 2B is the total channel bandwidth in Hertz, and $S_N$ is the noise spectrum, assumed constant over the band.

Figure 2:
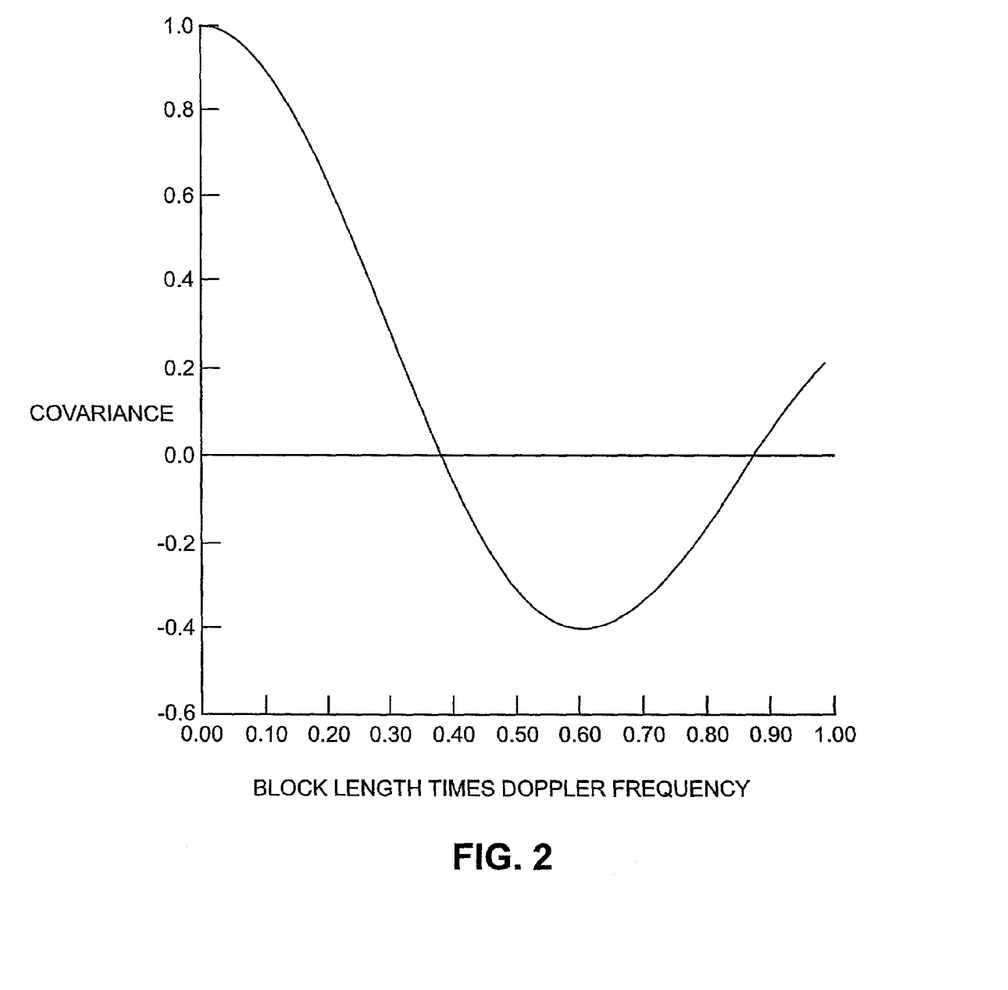
FIG. 2 illustrates a Jakes model autocorrelation function of a fading channel, $J_0$, with the covariance of the channel plotted as a function of block length times Doppler frequency.

The present invention assumes that the channel statistics are known but not the actual values of C(t). FIG. 2 illustrates the Jakes model autocorrelation function of a fading channel, $J_0$, with the covariance of the channel 150 plotted as a function of block length times Doppler frequency. See, W. C. Jakes, Microwave Mobile Communications (1974). It is noted that it might be advantageous to estimate the covariance from data or, more reliably, to estimate the spectrum of C(t) and Fourier transform the spectrum to estimate $R(\tau)$. The assumed Jakes model is specified as follows:

$$R(\tau)=E\{C(t)C^*(t+\tau)\}=J_0(2\pi f_d\tau) \qquad (3)$$

so the mean-square transfer through the channel 150 is unity, $J_0$ is the usual Bessel function, $f_d$ is the doppler frequency, and $\tau$ is time separation. It is noted that the covariance is simply a function of the distance moved during time $\tau$ measured in wavelengths. The Doppler frequency is $$f_d = \frac{v}{c} f_c$$

where v is velocity, $f_c$ the carrier frequency, and c is the velocity of light. Denoting the wavelength by $\lambda=c/f_c$ and distance by $s=v\tau$, the argument of the Bessel function is just $$2\pi \frac{s}{\lambda}.$$

Consider a time duration T for a data block and do a Karhunen-Loeve expansion of the channel. See, M. Schwartz et al., Communication Systems and Techniques, Ch. 1 (McGraw Hill, 1966). Specifically, as discussed below in the section entitled Channel Estimation Error, the channel C(t) is represented on $0 \leq t \leq T$ by the Karhunen-Loeve expansion, as follows:

$$C(t) = \sum_{P=0}^{\infty} c_p F_p(t) \qquad (4)$$

where the basis functions, $F_p(t)$, are the eigenfunctions of the following integral equation:

$$f_p F_p(t) = \int_0^T R(t-\tau) F_p(\tau) d\tau \qquad (5)$$

Figure 3:
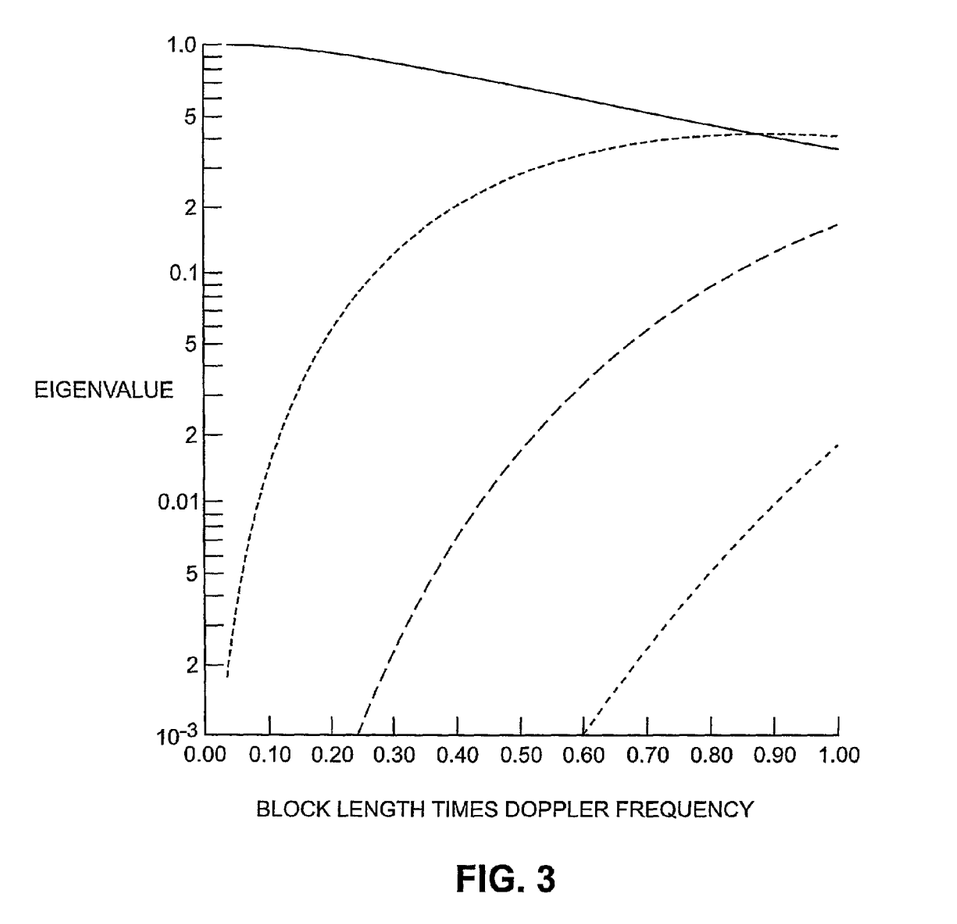
FIG. 3 illustrates standardized eigenvalues, $f_p = f_p/T$, for the Karhunen-Loeve expansion of the Jakes channel of FIG. 2.

FIG. 3 illustrates the standardized eigenvalues, $f_p=f_p/T$, for the Karhunen-Loeve expansion of the Jakes channel (see the section entitled Channel Estimation Error). In a pure Rayleigh fading, the expansion coefficients, $c_p$, expressed as follows:

$$c_p = \int_0^T C(t) F_p(t) dt \qquad (6)$$

have zero-mean and are uncorrelated, $$E\{c_p c_q^*\} = f_p \delta_{p,q} \qquad (7)$$

and, in particular, the variance of $c_p$ is the eigenvalue $f_p$. (Thus $|c_0|^2 \approx T$.) FIG. 3 is a plot of the normalized eigenvalues $f_0, \ldots, f_3$ as a function of the product of block length times Doppler frequency, $T \times f_d$. For example, a speed of 60 miles per hour and a carrier frequency of 1.8 GHz give a Doppler frequency of 160 Hz. Taking a block length of T=2.5 ms gives $T \times f_d \approx 0.4$, so the condition is satisfied.

Looking ahead, it can be seen that for $T \times f_d \leq 0.5$, the third eigenvalue, $f_2$, is more than 20 dB below $f_0$. Because the exemplary system is designed to operate near 12 dB S/I, this means that the truncated expansion discussed below in conjunction with Equation 13 has a truncation error less than the expected interference and noise.

Orthogonal Waveform Transmission

Figure 5:
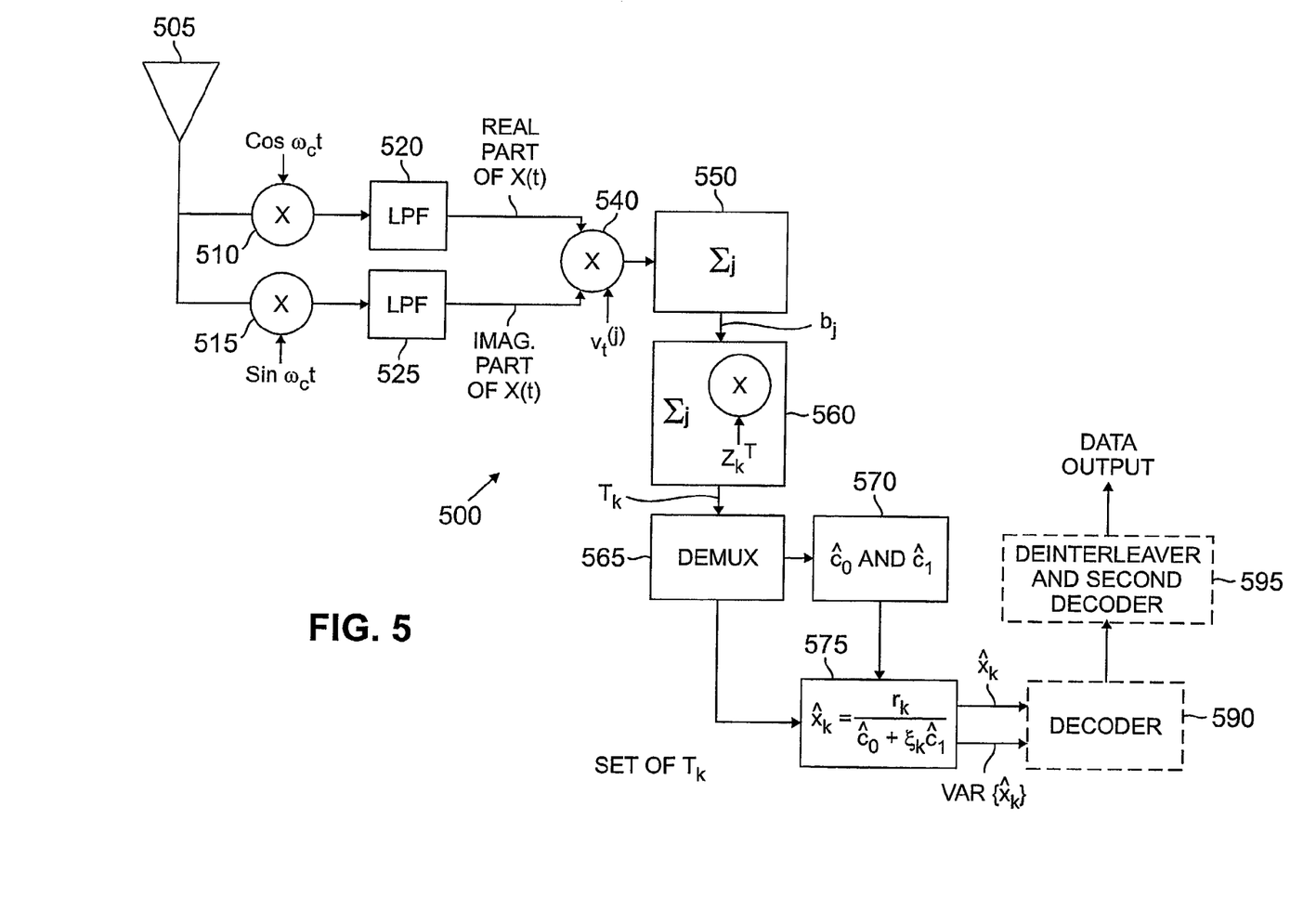
FIG. 5 is a schematic block diagram of the receiver of FIG. 1 incorporating features of the present invention.

Consider, temporarily, a transmitted signal X (t) made by a sum of K Slepian sequences, $v_t^{(k)}(N,W)$ where t is now taken as a discrete variable oversampled at a step $\Delta t$ with N samples equally spaced in (0,T). The bandwidth parameter $$W, 0 \leq W < \frac{1}{2},$$

gives the signal bandwidth in standardized units, that is $$2NW=2BT=K_0 \qquad (8)$$

where, as before, B is the physical bandwidth in Hertz. The number of basis sequences $K \leq K_0$.

$$X(t) = \sum_{k=0}^{K-1} a_k v_t^{(k)}(N, W) \quad (9)$$

where the complex coefficients, $a_k$, carry the information. Slepian sequences are used because they have the maximum possible energy concentration possible in the given bandwidth W of any time-limited sequence, as discussed below in the section entitled "Slepian Sequences and Functions." In a known unit gain channel 150, the standard receiver 500 for such a signal is defined as follows:

$$b_j = \sum_{t=0}^{N-1} R(t) v_t^{(j)} \quad (9A)$$

and, because the Slepian sequences are orthonormal, one has $b_j = a_j + \tilde{n}_j$ with $$E\{\tilde{n}_j \tilde{n}_k^*\} = \tilde{\sigma}^2 \delta_{jk}.$$

In addition, the orthonormal Slepian sequences and equation 8 imply that $\tilde{\sigma}^2 = S_N$.

Figure 4:
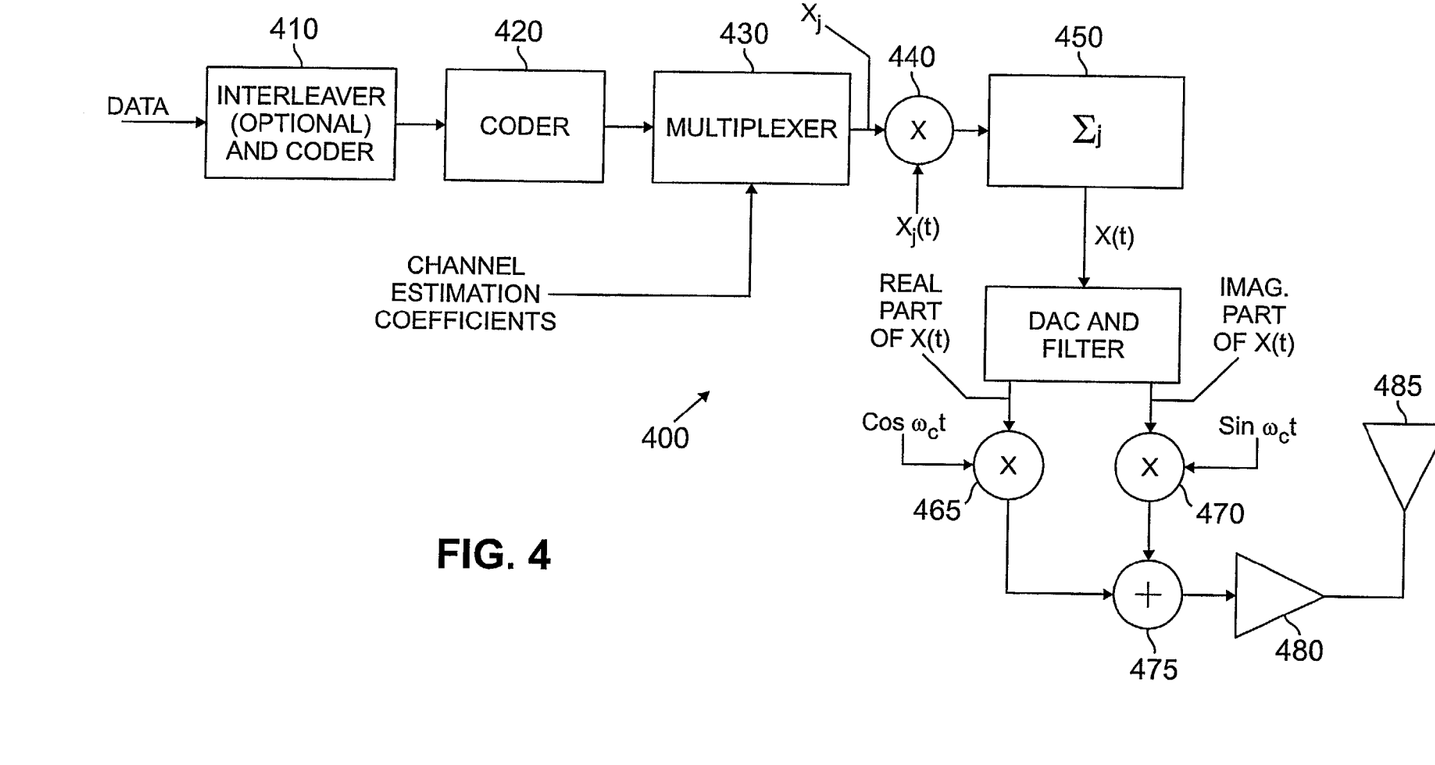
FIG. 4 is a schematic block diagram of the transmitter of FIG. 1 incorporating features of the present invention.

Now assume that such a signal is transmitted by the transmitter 400 through the fading channel 150 defined by equation 4 and the same receiver 500 is used. A receiver 500 should work in either a fading or known channel. Here the fading will "scramble" the received coefficients, so instead of a noisy, scaled copy of $a_j$, the simple receiver 500 gets:

$$b_j = \sum_{k=0}^{K-1} \left\{ \sum_{p=0}^{\infty} c_p \mathbb{T}_{jk}^{(p)} \right\} a_k + \tilde{n}_j \quad (10)$$

where the scrambling or transition matrices $T^{(p)}$ are given by $$\mathbb{T}_{jk}^{(p)} = \sum_{t=0}^{N-1} F_p(t) v_t^{(j)} v_t^{(k)} \quad (10A)$$

writing the transmission coefficients, $a_k$, as a vector:

$$A = (a_0, a_1, \ldots, a_{K-1}) \quad (11)$$

and similarly with the received coefficients, equation 10 becomes:

$$B = \left( \sum_{p=0}^{\infty} c_p \mathbb{T}_{jk}^{(p)} \right) A + N \quad (12)$$

It is now assumed that the channel can be approximated by the first two terms of equation 4. More specifically, $$C(t) \approx c_0 F_0(t) + c_1 F_1(t) \quad (13)$$

$$B \approx \{c_0 T^{(0)} + c_1 T^{(1)}\} A \quad (14)$$

As discussed below, the received coefficients are then "descrambled."

Orthogonalization

Consider the generalized eigenvalue problem:

$$T^{(1)} Z_h = \xi_h T^{(0)} Z_h \quad (15)$$

where $T^{(0)}$ and $T^{(1)}$ are as defined above, $Z_h$ is an eigenvector, and $\xi_h$ is the corresponding eigenvalue. It is assumed that the blocks are short enough that $T^{(0)}$ is positive definite. This can be checked by computing the ordinary eigenvalues of $T^{(0)}$ and is valid for $f_d \times T_- < 1.2$. Pairs, say $Z_h$ and $Z_t$, of eigenvectors of this system have the following orthogonality properties (see, F. R. Gantmacher, The Theory of Matrices (1959)):

$$Z_h^T T^{(0)} Z_t = \delta_{h,t} \quad (16)$$

and $$Z_h^T T^{(1)} Z_t = \xi_h \delta_{h,t} \quad (17)$$

The transmit coefficients $\{a_k\}$ from equation 9 are now written in terms of linear combinations of the eigenvectors Z, specifically:

$$A = \sum_{j=0}^{K-1} Z_j x_j. \quad (18)$$

Combining equations 9 and 18, the transmitted signal, X(t), can be expressed as $$X(t) = \sum_{j=0}^{K-1} x_j X_j(t) \quad (19)$$

where the transmit waveforms $$X_j(t) = \sum_{k=0}^{K-1} Z_{jk} v_t^{(k)}(N, W) \quad (20)$$

are the corresponding linear combinations of the Slepian sequences. As such, they inherit their bandlimited properties. One should note that, except for near the ends of the block, the $X_j(t)$'s resemble sinc-shaped bits but are optimally truncated.

Similarly, the corresponding receiver coefficients are defined as:

$$r_k = Z_k^T B. \quad (21)$$

Applying these receiver coefficients in equation 14 one has the received signal in "unscrambled" form, as follows:

$$r_k \approx \{c_0 + c_1 \xi_k\} x_k + \tilde{n}_k \quad (22)$$

known, except for $c_0$ and $c_1$. As before, the equality is approximate because the Karhunen-Loeve expansion was truncated. The approach is to estimate $c_0$ and $c_1$ by predefining a few "channel estimation coefficients," or CEC's.

Channel Recovery

A number, s, of the coefficients, denoted by $x_{(1)}, \ldots x_{(s)}$, are selected for channel estimation coefficients (CECs) and equation 22 is rewritten for these coefficients, as follows:

$$\begin{bmatrix} r_{(1)} \\ r_{(2)} \\ \vdots \\ r_{(S)} \end{bmatrix} = \begin{bmatrix} x_{(1)} & x_{(1)}\xi_{(1)} \\ x_{(2)} & x_{(2)}\xi_{(2)} \\ \vdots & \vdots \\ x_{(s)} & x_{(s)}\xi_{(s)} \end{bmatrix} \begin{bmatrix} c_0 \\ c_1 \end{bmatrix} + \begin{bmatrix} n_{(1)} \\ n_{(2)} \\ \vdots \\ n_{(s)} \end{bmatrix} \quad (23)$$

or the standard linear equations:

$$R_s = X_s C + N_s \quad (23A)$$

Most cellular systems already have numerous predefined or cell-specific bits patterns, such as colour codes, that can be used as the s selected CECs without increasing overhead. One could also make such usage specific to a given user by, for example, using the MIN in a page for channel estimation.

Because the $x_{(x)}$'s are specified, one can do a least-squares solution of this equation to estimate $c_0$ and $c_1$, as follows:

$$\hat{C} = \{X_s^\dagger X_s\}^{-1} X_s^\dagger R_s \quad (23B)$$

It is noted that, if the CECs are chosen symmetrically with respect to the block length, say $x_{(1)} = x_0$ and $x_{(s)} = x_{K-1}$ and similarly, then, because the eigenvalues $\xi$ are odd, i.e., $\xi_0 = -\xi_{K-1}$, the columns of $X_s$ are orthogonal and one obtains the simple estimates, as follows (the symmetries may also be used to reduce the number of operations used):

$$\hat{c}_0 = \frac{\sum_{k=1}^{s} x_{(k)} r_{(k)}}{\sum_{k=1}^{s} |x_{(k)}|^2} \quad \text{and} \quad (23C)$$

$$\hat{c}_1 = \frac{\sum_{k=1}^{s} \xi_{(k)} x_{(k)} r_{(k)}}{\sum_{k=1}^{s} \xi_{(k)}^2 |x_{(k)}|^2} \quad (23D)$$

A simple estimate for the rest of the $x_k$'s is now used:

$$\hat{x}_k = \frac{r_k}{\hat{c}_0 + \xi_k \hat{c}_1}. \quad (23E)$$

In a practical communications system, the average power of the $x_k$'s used for information symbols will be specified, for example, as follows:

$$E\{|x_k|^2\} = \overline{P}_I \quad (23F)$$

Consequently, if $\text{Var}\{\hat{x}_k\} \sim^{22} \overline{P}_I$, the symbol k should be classified as an "erasure" rather than attempting to decode it (since error correcting codes are more tolerant of erasures than of errors). The variances of the estimated channel coefficients can be derived. The average power of the CECs are denoted by $\overline{P}_s$, not necessarily the same as $\overline{P}_I$, $$\text{Var}\{\hat{c}_0\} = \frac{\text{Var}\{n_k\}}{\sum_{k=1}^{s} |x_{(k)}|^2} \approx \frac{\text{Var}\{n_k\}}{s \cdot \overline{P}_s} \quad \text{and} \quad (24)$$

$$\text{Var}\{\hat{c}_1\} = \frac{\text{Var}\{n_k\}}{\sum_{k=1}^{s} \xi_{(k)}^2 |x_{(k)}|^2} \approx \frac{Q \text{Var}\{n_k\}}{s \cdot \overline{P}_s} \quad \text{where} \quad (25)$$

$$Q = \frac{1}{\frac{1}{s} \sum_{k=0}^{s} \xi_{(k)}^2} \quad (26)$$

Signal-to-Noise Ratio

The received coefficient $r_k$ is written both in the form of equation 22 and as $$r_k = \{\hat{c}_0 + \hat{c}_1 \xi_k\} \hat{x}_k \quad (27)$$

and define $$\hat{x}_k = x_k + \delta x_k \quad (28)$$

Expanding equations 22 and 27 and dropping second-order terms, one has:

$$G_k \delta x_k = (\delta c_0 + \delta c_1 \xi_k) x_k + n_k \quad (29)$$

where the random gain, $G_k$, is $$G_k = c_0 + c_1 \xi_k. \quad (30)$$

$G_k$ is taken as fixed for a given realization so, because the different terms on the right of equation 29 are independent, one has $$E\{|\delta x_k|^2\} = \frac{\text{Var}\{\hat{c}_0\}|x_k|^2 + \text{Var}\{\hat{c}_1\}|x_k|^2 \xi_k^2 + \text{Var}\{n_k\}}{|G_k|^2} \quad (31)$$

Now, using equations 24 and 25 in equation 31 and letting $\text{Var}\{n_k\} = \sigma^2$ $$\sigma^2 = \tilde{\sigma}^2 \cdot \frac{\text{Ave}}{k} \|Z_k\|^2 + \in_T^2 \quad (32)$$

where $\in_T^2$ is the truncation mean-square error that is bounded, as discussed below in the section entitled "Truncation Error Bound."

$$\text{Var}\{x_k\} = \frac{\sigma^2}{|G_k|^2}\left(1 + \frac{\gamma}{s}(1 + Q_k)\right) \quad (33)$$

where $\gamma$ is the ratio of the power in information symbols to that of CEC's $$\gamma = \frac{\overline{P}_I}{\overline{P}_s} \quad (33A)$$

and $$Q_k = \xi_k^2 Q \quad (33B)$$

The output signal-to-noise power ratio for symbol $x_k$ is thus $$\rho_k = \frac{|x_k|^2}{Var\{x_k\}} \tag{34}$$

or $$\rho_k = \frac{\overline{P_i}|G_k|^2}{\sigma^2\{1 + \frac{1}{s}(1+\gamma Q_k)\}} \tag{34A}$$

The total energy transmitted is:

$$E_{stg} = s\overline{P}_s + (K-s)\overline{P}_I = T\overline{P} \tag{35}$$

or $$E_{stg} = \overline{P}_I\{K + s(\gamma - 1)\} \tag{35A}$$

and the total noise energy is:

$$E_n = 2BTS_N = K_0 S_N \tag{36}$$

The average signal-to-noise ratio is thus $E_{stg}/E_n$, or:

$$\rho = \frac{s\overline{P}_s + (K-s)\overline{P}_i}{2BT} \tag{37}$$

so the symbol SNR becomes:

$$\rho_k = \rho \frac{K_0}{K + s(\gamma-1)} \frac{|G_k|^2}{1 + \frac{1}{s}(1+\gamma Q_k)} \tag{38}$$

Bandwidth

A TDMA system has three basic free parameters:
1. Doppler Frequency×Block Length–For example, a speed of 60 miles per hour and a carrier frequency of 1.8 GHz give a Doppler frequency $f_d$=160 Hz. Taking a block length of T=2.5 ms, gives T×$f_d$≈0.4, so the condition is satisfied.
2. Delay Spread×Bandwidth—For example, a delay spread of 10 microseconds and a bandwidth of 40 kHz is 10 μS×40 kHz=0.4. If one keeps the bandwidth below 40 kHz, one can probably ignore delay spread in most cases.
3. Block Length×Bandwidth The first two parameters depend on the environment, and the last parameter determines how computationally intensive the system is.

EXAMPLE

An exemplary system has:
bandwidth of 30 MHz (1000×30 kHz);
Blocks/s/channel 400;
Block Length 2.5 ms;
Users/channel 8;
50 blocks/user/s;
K=2BT=74, Sync Symbols 4
Information Symbols 70/block;

so the 3500 symbols/user/second. Take K=74, γ=1, and s=4 CEC's.

Near the center of the block $Q_k \approx 0$ so $$\rho_c \approx \rho |G_c|^2 \frac{75}{74} \frac{4}{5}$$

or about 0.91 dB below a fully coherent system operating on the same random channel and knowing the channel. Differential coding is often advocated for fading channels but has two major disadvantages: First, simple differential coding systems reduce performance by 3 dB. Second, they have an irreducible error rate in the type of fading under consideration independent of SNR. It is well known that the average number of zeroes per second of a random process with autocorrelation function $$R(\tau) \text{ is } \frac{1}{\pi}\left(-\frac{R''(0)}{R(0)}\right)^{\frac{1}{2}}$$

or here, $\sqrt{2}f_d$ and each zero crossing will probably cause an error in a differential system.

ALTERNATE EMBODIMENTS

Channel estimation can be improved by doing a preliminary decoding as discussed above, and then using data bits that decoded with a small apparent variance to improve the channel estimation.

It would be advantageous to choose orthogonal sequences as CEC's and use them as color codes. Thus, cells that are likely to interfere would be assigned different CEC's. A user would then estimate all possible CEC's and decide if the received signal was the intended one, or interference, or a mixture.

Channel estimation may be done by robust regression. One has both the theoretical expressions of equations 24 and 25 and direct evaluation of the residuals from solving equation 23. Agreement would indicate reliable channel estimates, while disagreement might indicate that one had decoded an interfering signal instead of the desired one.

In the case of multiple antennas, the CEC's are replaced with CEC matrices. If one had, for example, J=3 antennas (representing, for example, separate polarizations) one could code the three data streams as follows:

$$\begin{bmatrix} 1 & 0 & 0 & \dots & data_0 & \dots & 1 & 0 & 0 \\ 0 & 1 & 0 & \dots & data_1 & \dots & 0 & 1 & 0 \\ 0 & 0 & 1 & \dots & data_2 & \dots & 0 & 0 & 1 \end{bmatrix} \tag{39}$$

and decode as above noting that $c_0$ and $c_1$ become J×J matrices $C_0$ and $C_1$ while A and B become K×J matrices instead of vectors. See, for example, U.S. Pat. No. 6,317,098, issued to Andrews et al. and assigned to the assignee of the present invention, for a discussion of a multiple antenna implementation.

Because the system is essentially bandlimited, one could use M such systems in parallel by spacing subcarriers 2W apart. That is, replace equation 19 with, for example, $$X(t) = \sum_{m=0}^{M-1} e^{i2\pi 2Wmt} \sum_{j=0}^{K-1} x_{m,j} X_j(t) \tag{40}$$

so that M×K symbols are transmitted per block. Taking M=32 as an example, one could put 32 parallel 30 kHz subchannels in a 960 kHz block and use successive 32-point FFT's to generate and separate the subchannels. A complex sampling rate of 960 kHz is used in the exemplary embodiment, giving a frequency range of ±480 kHz, so a 32-point FFT gives a frequency spacing of 30 kHz. With multiple antennas or polarizations, the symbol rate is J×M×K.

Rather then assuming a Jakes model for the channel 150, a history of $\hat{c}_0$ and $\hat{c}_1$ can be maintained for each block. Thus, one has past values of C(t) from equation 4. R(τ) can be estimated from $\hat{c}(t)$ and the first part of equation 3. In other words, $$\hat{c}(t) = \frac{1}{N_{past}} \sum_{t=1}^{N_{past}} \hat{c}(t)\hat{c}^*(t+\tau)$$

then, the precomputed values discussed in the following section are estimated.

Exemplary Transmitter and Receiver

An exemplary transmitter 400 and receiver 500 employing a number of the above equations are discussed in conjunction with FIGS. 4 and 5, respectively. As previously indicated, the present invention employs a channel estimation technique that employs a channel estimate based upon statistics of the channel, which is then updated based upon current channel estimates. The statistical behavior is obtained by precomputing the values of $f_p$ and $F_p$ from equation 5; matrices $T^{(0)}$ and $T^{(1)}$ from equation 10A; and an eigenvector, $Z_h$, and corresponding eigenvalue, $\xi_h$, from equation 15. The eigenvector, $Z_h$, and corresponding eigenvalue, $\xi_h$, can be computed in accordance with the techniques described in B. S. Garbow et al. Lecture Notes in Computer Science, Section 2.1.5 (1977), incorporated by reference herein. The precomputed values are loaded into the transmitters 400 and receivers 500, for example, at the time of manufacture. A number, s, of bits from the coefficients are assigned to the channel. In an exemplary implementation, two bits are used near the ends of the blocks and a few other bits are normally used, for, e.g., "color codes" or similar techniques that do not change often.

FIG. 4 is a schematic block diagram of the transmitter 400 of FIG. 1 incorporating features of the present invention. As shown in FIG. 4, the data to be transmitted may initially be optionally interleaved and that encoded using error correction techniques by an interleaver/coder 410 and then encoded into channel waveforms by a coder 420. Thereafter, a multiplexer 430 multiplexes the coded data with the preassigned channel estimation coefficients, $x_{(1)} \ldots x_{(s)}$, to produce the complex coefficients, $x_j$, (a combination of data and CECs) that are used in equation 19.

Thereafter, the complex coefficients, $x_j$, are multiplied by the transmit waveforms, $X_j(t)$, defined by equation 20, using a multiplier 440 and then the product is summed over the range j=0 through j=K−1 by a summer 450, in accordance with equation 19, to produce the complex transmitted data, X(t). The complex transmitted data, X(t), is then converted to an analog signal and filtered at stage 460. The real part of the complex transmitted data, X(t), is multiplied by Cos $\omega_c t$ using a multiplier 465 and the imaginary part of the complex transmitted data, X(t), is multiplied by Sin $\omega_c t$ using a multiplier 470. The two products are then added by an adder 475, amplified and filtered at stage 480, before being transmitted by an antenna 485.

FIG. 5 is a schematic block diagram of the receiver 500 of FIG. 1 incorporating features of the present invention. As shown in FIG. 5, the signal received by an antenna 505 is initially returned to baseband by (i) multiplying the received signal by Cos $\omega_c t$ to obtain the real part of the complex received signal, R(t), using a multiplier 510 and (ii) multiplying the received signal by Sin $\omega_c t$ to obtain the imaginary part of the complex received signal, R(t), using a multiplier 515. The two products are then filtered by low pass filters 520, 525 to produce the received signal, R(t), as defined by equation 1.

The real and imaginary parts of the received signal, R(t), are then multiplied with the Slepian sequences, $v_t^{(j)}$, by a multiplier 540, and the product is then summed over the range t=0 through N−1 by a summer 550 to produce the value, $b_j$, in accordance with equation 9. Equation 21 is implemented at state 560 to produce the receiver coefficients, $r_k$. A demultiplexer 565 then processes the receiver coefficients, $r_k$, to produce the CECs, $r_{(1)} \ldots r_{(s)}$, that are applied to stage 570 to generate the values $\hat{c}_0$ and $\hat{c}_1$ in accordance with equations 23C and 23D.

In addition, the demultiplexer 565 processes the receiver coefficients, $r_k$, to produce the set of receiver coefficients, $r_k$, that are applied to stage 575 together with the computed values of $\hat{c}_0$ and $\hat{c}_1$ to obtain $\hat{x}_k$ in accordance with equation 23E. A decoder 590 determines the variance of $\hat{x}_k$ to decode the received signal to identify the data and erasures, which are then optionally deinterleaved and then decoded (error correction decoding) by a deinterleaver/decoder 595 to produce the decoded data output. The decoder 590 can employ techniques that are common in CD players, where a corrupted block that cannot be decoded is marked as an erasure and sent to the deinterleaver/decoder 595. For example, if Var$\{\hat{x}_k\} \gtrsim \overline{P}_l$ (approximately 2.5 in an exemplary embodiment), the symbol k should be classified as an "erasure" rather than attempting to decode it. It is noted that optimal error correction codes, such as Reed-Solomon codes, will correct more erasures than errors.

In a further variation, if some of the $\hat{x}_k$ values have small variances and are closer to a nominal symbol, for example, in an 8-phase PSK system, a nominal "noise free" symbol is compared to the data decoded by the stage 575. The "good" $\hat{x}_k$ values are used and the nominal symbols are added to stage 570 to obtain improved estimates of $\hat{c}_0$ and $\hat{c}_1$. This technique is particularly useful when some of the variances are large.

Channel Estimation Error

The Standardized Integral Equation is expressed as:

$$\tilde{f}_p \tilde{F}_p(t) = \int_0^1 J_0(k(t-\tau))\tilde{F}_p(\tau)d\tau \qquad (41)$$

Specifically, C(t) is represented by:

$$C(t) \approx \sum_{p=0}^{P-1} c_p F_p(t) \quad 0 \le t \le T. \qquad (42)$$

on a set of (temporarily unspecified) orthonormal functions $F_p(t)$ $$\int_0^T F_p(t)F_q(t)dt = \delta_{pq}. \qquad (43)$$

Minimizing the squared error $$\int_0^T \left| C(t) - \sum_{p=0}^{P-1} c_p F_p(t) \right|^2 dt \quad (44)$$

gives the usual expansion coefficients:

$$c_p = \int_0^T F_p(t) C(t) dt. \quad (45)$$

The expansion error is:

$$E_c = \int_0^T |C(t)|^2 dt - \sum_{p=0}^{P-1} |c_p|^2. \quad (46)$$

For an efficient system, it is clearly desirable to minimize $E_c$. To determine the best basis functions, $F_p(t)$, one begins by solving the integral equation $$f_p F_p(t) = \frac{1}{T} \int_0^T R(t-\tau) F_p(\tau) d\tau \quad (47)$$

The eigenvalues of this equation, $f_p$, are given in normalized form and plotted in FIG. 2.

These expansion coefficients are uncorrelated, that is $$E\{c_j c_k^*\} = \rho f_j \delta_{j,k} \quad (47A)$$

so, evaluating the error, using equation 46, one has $$E\{E_c\} = \rho \left\{ 1 - \sum_{p=0}^{P-1} f_p \right\} \quad (48)$$

While this equation is of theoretical interest one does not observe C(t) directly. In a noisy channel, the best one could do would be to transmit carrier only and so observe $$C(t) = \sqrt{\rho} C(t) + N(t) \quad (49)$$

giving coefficients:

$$C_p = \sqrt{\rho} c_p + n_p \quad (50)$$

where, as before, the $c_p$'s and $n_p$'s are uncorrelated. This allows one to do a Wiener filter on the K-L basis. Define a weight $w_p$ and minimize the mean-square error between $c_p$ and $C_p$, i.e., define:

$$\hat{c}_p C_p w_p$$

$$e_p = E\{|c_p - w_p C_p|^2\}$$

giving immediately:

$$w_p = \frac{\rho f_p}{1 + \rho f_p} \quad (51)$$

resulting in a per-coefficient error $$e_p = w_p$$

so the expected coefficient variance is less than the noise variance for all $\rho$.

Slepian Sequences and Functions

The Unit Energy Sequence, $v_n, n=0,1 \ldots, N-1$ Fourier Transform, can be expressed as:

$$V(f) = \sum_{n=0}^{N-1} v_n e^{-i2\pi f n}$$

Maximize Energy in (−W,W)

$$\max \int_{-W}^{W} |V(f)|^2 df - \lambda \sum_{n=0}^{N-1} v_n^2$$

$$\lambda_k v_t^{(k)} = \sum_{n=0}^{N-1} \frac{\sin 2\pi W(n-t)}{\pi(n-t)} v_n^{(k)}$$

$$\lambda_k U_k(f) = \int_{-W}^{W} \frac{\sin N\pi(f-\xi)}{\sin \pi(f-\xi)} U_k(\xi) d\xi$$

Truncation Error Bound

The details of showing that the truncation error is bounded are as follows.

First, recall from equation 10 that the truncation error is:

$$\epsilon_{j,k}^T = \sum_{p=2}^{\infty} c_p \mathbb{T}_{jk}^{(p)} \quad (52)$$

where the transition matrices were defined to be:

$$\mathbb{T}_{jk}^{(p)} = \sum_{t=0}^{N-1} F_p(t) v_t^{(j)} v_t^{(k)}$$

Temporarily, ignore the coefficients $c_p$ and regard $T_{jk}^{(p)}$ as the coefficient in an expansion of the product $v_t^{(j)} v_t^{(k)}$ on the $F_p(t)$'s. By the Bessel inequality, one has:

$$\sum_{p=2}^{\infty} |\mathbb{T}_{jk}^{(p)}|^2 \leq \sum_{t=0}^{N-1} |v_t^{(j)} v_t^{(k)}|^2$$

The average, over j and k, is similarly bounded:

$$\overline{\varepsilon^2} = \frac{1}{K^2}\sum_{j,k=0}^{K-1}\sum_{p=2}^{\infty}|\mathbb{T}_{jk}^{(p)}|^2 \le \sum_{n=0}^{N-1}\sum_{j=0}^{K-1}|v_t^{(j)}|^2\sum_{k=0}^{K-1}|v_t^{(k)}|^2 \quad (53)$$

Miller's theorem shows:

$$\sum_{k=0}^{K-1} v_t^{(k)} v_n^{(k)} \approx \frac{\sin 2\pi W(t-n)}{\pi(t-n)}$$

so both the inner sums on the right of (53) equal 2W, so the overall right-hand side becomes $N(2W)^2$. Replacing the $c_p$'s, recall that their expected mean-square value is $f_p$. The bound is not decreased by replacing the smaller $c_p$'s with the largest one, so:

$$E\left\{\frac{1}{K^2}\sum_{j,k=0}^{K-1}|\epsilon_{j,k}^T|^2\right\} \le \frac{2Wf_2}{K}$$

Current TDMA channel units for a 2B=30 kHz channel sample at 120 kHz so W=1/8. A single coefficient, say $b_j$, is a sum of the K terms $\in_{j,k}^T x_k$, so the total truncation error per coefficient:

$$\delta b_j^2 \le 2Wf_2\overline{P}$$

or, relative to average power, $2Wf_2$. Since $$W < \frac{1}{2}, f_2$$

is a strict bound on relative truncation error.

Obtaining Real-Time Estimates of the Channel:

In one embodiment, a real-time estimate of the channel is estimated by tracking the channel and counting a zero crossing rate using Jakes model to obtain an estimate of the Doppler frequency, $f_d$. In another embodiment, a real-time estimate of the channel is estimated by the following sub-method:

partially decoding all data blocks (including those of other users) to a point where the channel estimates, $c_0$ and $c_1$, are available, pursuant to the following equations:

$$\hat{c}_0 = \frac{\sum_{k=1}^{s} x_{(k)} r_{(k)}}{\sum_{k=1}^{s} |x_{(k)}|^2}; \text{ and}$$

$$\hat{c}_1 = \frac{\sum_{k=1}^{s} \xi_{(k)} x_{(k)} r_{(k)}}{\sum_{k=1}^{s} \xi_{(k)}^2 |x_{(k)}|^2};$$

estimating C(t) in each block as follows, $C(t) \approx c_0 F_0(t) + c_1 F_1(t)$;

obtaining a series of equally spaced samples C(1/4T) and C(3/4T);

storing data from a predefined number of blocks (e.g., 50-250 blocks or a few hundred milliseconds) to estimate current statistical conditions;

estimating a power spectrum from these samples, e.g., using known techniques, such as a multitaper technique;

applying a Fourier transform to the estimated spectrum to obtain an estimate of the autocovariance function, $R(\tau)$; and computing the eigenfunctions from the following equation:

$$f_p F_p(t) = \int_0^T R(t-\tau) F_p(\tau) d\tau.$$

Finally, a real-time estimate of the channel can be obtained by evaluating the expression:

$$\hat{c}(t) = \frac{1}{N_{past}} \sum_{t=1}^{N_{past}} \hat{c}(t)\hat{c}^*(t+\tau)$$

where ĉ are channel estimates and $N_{past}$ are past values of the noise.

It is to be understood that the embodiments and variations shown and described herein are merely illustrative of the principles of this invention and that various modifications may be implemented by those skilled in the art without departing from the scope and spirit of the invention.

I claim:

1. A method for estimating a channel, comprising the steps of:
    employing one or more basis functions that describe said channel based on statistics of said channel;
    employing one or more waveforms that are matched to said channel;
    estimating coefficients for said basis functions using real-time data by solving a set of linear equations to estimate said channel; and
    providing said estimated coefficients for said basis functions for use by one or more communications devices.

2. The method according to claim 1, wherein received scrambled coefficients are descrambled using transition matrices, $T^{(p)}$.

3. The method according to claim 2, wherein two of said transition matrices, $T^{(0)}$ and $T^{(1)}$, are used to approximate an effect of said channel and the descrambling of said scrambled coefficients is performed using the generalized eigenvalues and eigenvectors of said two transition matrices and wherein said transition matrices $T^{(p)}$ are given by:

$$\mathbb{T}_{jk}^{(p)} = \sum_{t=0}^{N-1} F_p(t) v_t^{(j)} v_t^{(k)}.$$

4. The method according to claim 1, further comprising the steps of employing a number, s, of coefficients, $x_{(1)} \ldots x_{(s)}$, solving the following linear equations:

$$R_s = X_s C + N_s$$

for $\hat{c}_0$ and $\hat{c}_1$ to correct other received bits, where $R_s$ denotes the received signal, $X_s$ denotes the transmitted signal, C represents the channel and N indicates the noise on said channel.

5. The method according to claim 1, wherein said channel is a fading channel.

6. The method according to claim 1, wherein said channel is a wireless channel.

7. The method according to claim 1, further comprising the step of updating said estimated coefficients for said basis functions.

8. The method according to claim 1, wherein said step of employing one or more basis functions further comprises the step of performing a Karhunen-Loeve expansion to obtain said channel estimation.

9. The method according to claim 1, wherein said step of employing one or more waveforms further comprises the step of communicating information using said waveforms.

10. The method according to claim 1, wherein said waveforms are Slepian sequences.

11. The method according to claim 10, wherein received information is decoded by multiplying a received signal by said Slepian sequences and aggregating over a data block.

12. The method according to claim 1, wherein said step of employing one or more basis functions further comprises the step of using Karhunen-Loeve basis functions corresponding to a theoretical autocorrelation using Jakes model and an estimate of the Doppler frequency, $f_d$.

13. The method according to claim 1, wherein said step of employing one or more basis functions further comprises the step of using Karhunen-Loeve basis functions based on an estimate of a channel correlation function.

14. The method according to claim 1, wherein said step of estimating a real-time estimate of said channel further comprises the step of tracking said channel and counting a zero crossing rate using Jakes model to obtain an estimate of the Doppler frequency, $f_d$.

15. The method according to claim 1, wherein said step of estimating coefficients further comprises the steps of:
partially decoding all data blocks (including those of other users) to a point where the estimates of $c_0$ and $c_1$ are available, pursuant to the following equations:

$$\hat{c}_0 = \frac{\sum_{k=1}^{s} x_{(k)} r_{(k)}}{\sum_{k=1}^{s} |x_{(k)}|^2} \text{ and}$$

$$\hat{c}_1 = \frac{\sum_{k=1}^{s} \xi_{(k)} x_{(k)} r_{(k)}}{\sum_{k=1}^{s} \xi_{(k)}^2 |x_{(k)}|^2};$$

using the following equation, $C(t) \approx c_0 F_0(t) + c_1 F_1(t)$, to estimate $C(t)$ in each block;
obtaining a series of equally spaced samples;
keeping data from a predefined number of blocks to estimate current statistical conditions;
estimating a power spectrum from these samples;
applying a Fourier transform to said estimated spectrum to obtain an estimate of the autocovariance function, $R(\tau)$; and
computing the eigenfunctions from the following equation:

$$f_p F_p(t) = \int_0^T R(t-\tau) F_p(\tau) d\tau.$$

16. The method according to claim 1, wherein said step of estimating coefficients further comprises the step of evaluating the expression:

$$\hat{c}(t) = \frac{1}{N_{past}} \sum_{t=1}^{N_{past}} \hat{c}(t) \hat{c}^*(t+\tau)$$

where $\hat{c}$ are channel estimates and $N_{past}$ values of the noise.

17. A method for obtaining an in-band estimate of a channel, comprising the steps of:
computing one or more basis functions to describe said channel based on the statistics of said channel;
employing transmission waveforms whose energy is largely restricted to a bandwidth assigned to said channel;
computing expected distortions to said transmission waveforms caused by said channel;
estimating a real-time estimate of said channel from said distortions by solving a set of linear equations; and
providing said estimated real-time estimate of said channel for use by one or more communications devices.

18. A receiver in a communication network having a fading channel, said receiver comprising:
a memory that stores computer-readable code; and
a processor operatively coupled to said memory, said processor configured to implement said computer-readable code, said computer-readable code configured to:
employ one or more basis functions that describe said channel based on statistics of said channel;
employ one or more waveforms that are matched to said channel; and
estimate coefficients for said basis functions using real-time data by solving a set of linear equations.

19. The receiver according to claim 18, wherein said fading channel is a wireless channel.

20. A receiver in a communication network having fading channels, said receiver comprising:
means for employing one or more basis functions that describe said channel based on statistics of said channel;
means for employing one or more waveforms that are matched to said channel; and
means for estimating coefficients for said basis functions using real-time data by solving a set of linear equations.

* * * * *